No. 806,603. PATENTED DEC. 5, 1905.
W. A. VAN BERKEL.
MEAT SLICING MACHINE.
APPLICATION FILED NOV. 24, 1903.
2 SHEETS—SHEET 1.
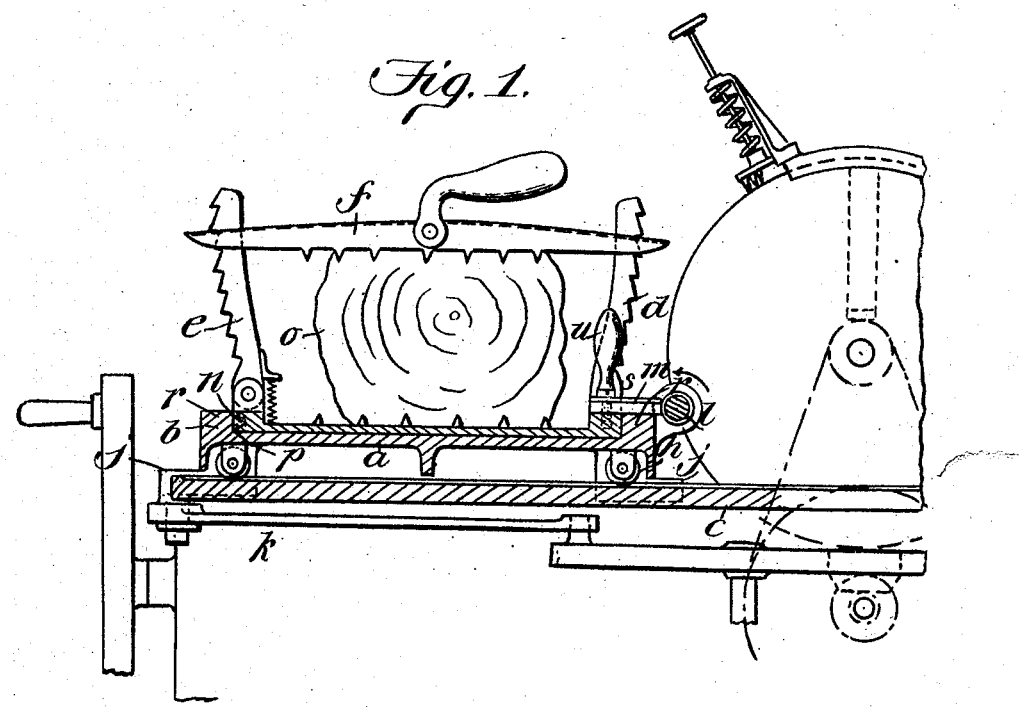
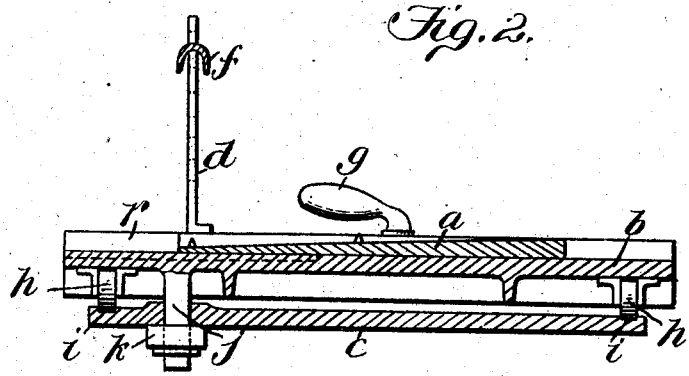
Witnesses:
Inventor
Wilhelmus A. van Berkel
By James L. Norris
Atty.

No. 806,603. PATENTED DEC. 5, 1905.
W. A. VAN BERKEL.
MEAT SLICING MACHINE.
APPLICATION FILED NOV. 24, 1903.
2 SHEETS—SHEET 2.
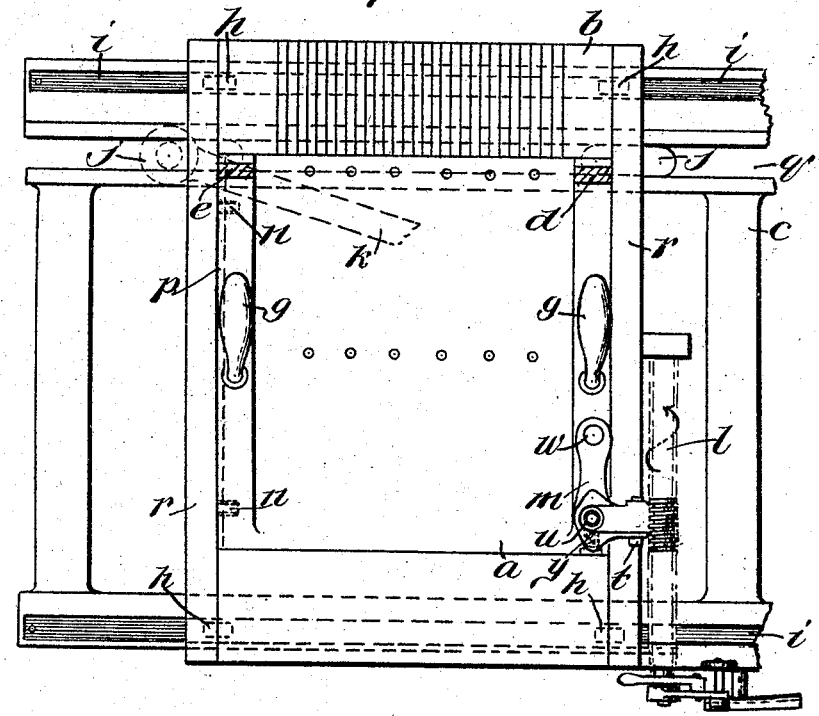
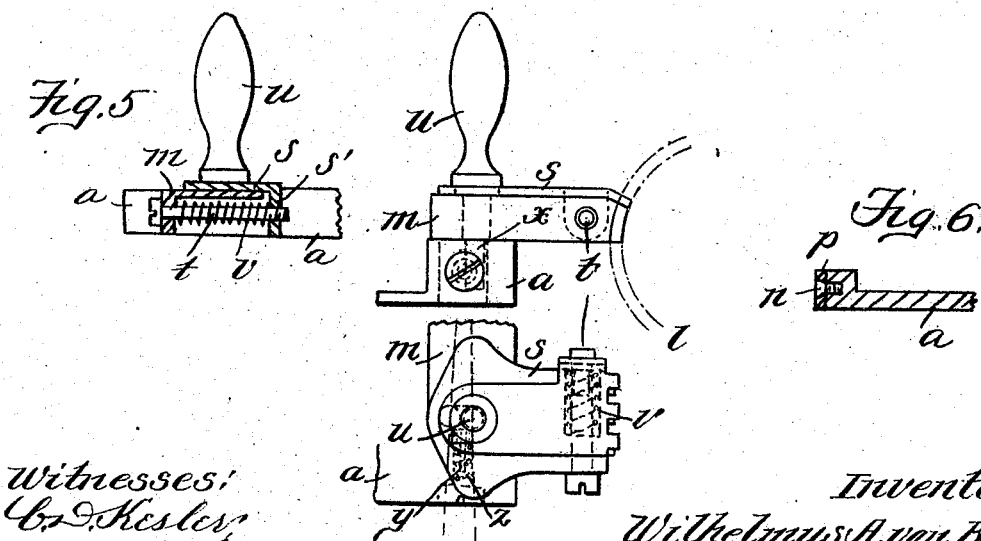
Witnesses:
Inventor
Wilhelmus A. van Berkel
By James L. Norris
Atty.

UNITED STATES PATENT OFFICE.

WILHELMUS ADRIANUS VAN BERKEL, OF ROTTERDAM, NETHERLANDS.

MEAT-SLICING MACHINE.

No. 806,603. Specification of Letters Patent. Patented Dec. 5, 1905.

Application filed November 24, 1903. Serial No. 182,548.

*To all whom it may concern:*

Be it known that I, WILHELMUS ADRIANUS VAN BERKEL, manufacturer, a subject of the Queen of the Netherlands, residing at 56 Boezemsingel, Rotterdam, in the Kingdom of the Netherlands, have invented certain new and useful Improvements in Meat-Slicing Machines, of which the following is a specification.

This invention relates to certain improvements in slicing-machines with rotary circular knives described in Patents No. 628,742, of July 17, 1899, and No. 635,225, of October 17, 1899, and relates to the plate on which the piece of meat is clamped and to the movement of the reciprocating table.

In the present arrangement of the machines the meat-plate cannot be removed without the machines being partially taken apart, and if the piece of meat to be sliced is to be changed the meat-holding clamp has to be released, the piece of meat removed, and the fresh piece to be cut clamped firmly on the plate. Should it be necessary to cut further slices from the first piece of meat, it can never be clamped again in exactly the same position as before, and thus considerable waste is caused before complete slices can be again cut off. It has also been found that the dovetail guiding of the reciprocating table hitherto employed does not wear well. In fact, it frequently happens that a table guided in this manner jams and cannot be maintained in motion without trouble.

The object of the present invention is to avoid the necessity of constantly clamping up and releasing the piece of meat and to obtain a noiseless movement free from friction of the reciprocating table. For this object the table-plate is so arranged that by simply lifting it, together with the piece of meat, it may be removed from the machine. The reciprocating table moves on rollers over the frame, the track of said rollers being covered with leather strips. A slot is provided in the frame for guiding the table, into which slot two studs or catches provided on the table project.

The object of the present invention is shown in the accompanying drawings.

Figure 1 is a cross-section; Fig. 2, a longitudinal section; Fig. 3, a plan view of the table. Fig. 4 represents, on an enlarged scale, a toothed piece for moving forward the meat-plate. Figs. 5 and 6 are details.

Two curved racks $d$ and $e$ are mounted on a plate $a$, which tapers to the front in the ordinary manner, which racks form, in conjunction with a clamp-lever $f$ on the reciprocating table $b$, a well-known device for holding the piece of meat.

The means for moving forward the meat-plate $a$ each time to the extent of the thickness of the slice are arranged at the side and mounted above the table $b$. The plate $a$ lies quite free between lateral guide-bars $r$ on the table $b$.

A traveling piece $m$, provided with teeth, is mounted on the right-hand side, which teeth gear with a screw $l$ of the shifting mechanism. When this screw is turned in the ordinary manner in the direction indicated by the arrow, the plate $a$, and with it also the piece of meat, is fed to the knife. In order in the simplest manner possible to avoid any play arising in the screw $l$ from wear, the toothed piece $m$ has the form shown in Fig. 4. The upper member $s$ of the toothed piece is adjustably arranged and may be adjusted by means of a set-screw $t$ engaging in a depending projection $s'$, formed on the member $s$. A spiral spring $v$ is arranged within a recess in the toothed piece $m$, and said spring $v$ surrounds the screw $t$ and bears against the projection $s'$, forcing it to the right in such a way that no play can result; but yet the screw $l$ may be turned without trouble.

As it would take too much time to bring the meat before the knife by turning the screw $l$ or by lifting the plate $a$ from the table and replacing it in the desired position, means are provided for removing the toothed traveling piece $m$ out of gear with the screw $l$. The meat-plate $a$ can then be moved freely on the table $b$ without lifting it up from the same. For this purpose the piece $m$ is provided with a swivel-point $w$, Fig. 3, and a handle $u'$ is arranged to bring this piece $m$ into the position I in gear with or into the position II, out of gear with the screw $l$, Fig. 4. In order to fix the piece $m$ in one of these positions, a catch-pin $y$, with projecting point, is arranged in an aperture of the meat-plate $a$. The projecting point is provided at its end with two oblique faces, and the catch-pin is pressed outward by means of a spiral spring $z$. A downwardly-extending pin $x$ is arranged at the under side of the piece $m$. Now the catch-pin $y$ may be pressed away by this pin without difficulty, and the piece $m$ is then fixed in the position into which it is brought by the downwardly-extending pin $x$ engaging behind the projecting point of the catch-pin $y$.

The plate $a$, together with the piece of meat $o$ and the clamping device $d\ e\ f$, may be lifted off the table by handles $g$ without it being necessary to release a single screw.

Setting-bars $p$ in the form of elongated strips are provided and which are adapted to increase the width of the plate $a$, and said bars $p$ are arranged at the left-hand side of said plate and are removably secured to the said plate $a$ through the means of the screw $n$. By the employment of one or more of these bars it insures an exact guidance of the plate between the guide-bars $r$.

Rollers $h$ are provided on the under side of the plate $b$ at the four corners, by means of which rollers the reciprocating table $b$ travels over the table-frame $c$. The track of these rollers is covered by strips $i$ of leather or other suitable material. The table $b$ is guided in a slot $q$ of the table-frame $c$, Fig. 3, into which slot projections or studs $j$, formed on the table $b$, suitably fit. The front projection $j$ is prolonged downwardly and forms the point of attachment for a draw-bar $k$, which operates the reciprocating movement of the table. The advantages of this arrangement over those hitherto employed are that the piece of meat, which has been first clamped, remains on the meat-plate until it is entirely sliced. If another piece is to be sliced by the machine, the first piece of meat, together with its plate, is removed and laid aside until it is to be again sliced and the table $b$ travels quite noiselessly, with its rollers, over the strips of leather $i$ and is easily and with certainty guided in the slot $q$, and the jambing cornerwise, such as happens with the dovetail grooved guides hitherto employed, is thus avoided.

I declare that what I claim is—

1. A meat-slicing machine embodying a reciprocatory table provided with vertical guide-bars extending in the direction of the length of the table, each of said bars having its inner face extending in a vertical plane, a removable meat-plate mounted upon said table between said bars and having the side edges thereof corresponding in contour to the inner faces of said bars, said plate reciprocating with said table and capable of being shifted on the table in the direction of the length thereof, a swinging member carried by said plate, and rotatable means carried by the table and engaging with said member and adapted when in engagement with said member and operated to cause the adjustment of said plate in a direction opposite to the travel of the table.

2. A meat-slicing machine embodying a reciprocatory table provided with vertical guide-bars extending in the direction of the length of the table, each of said bars having its inner face extending in a vertical plane, a removable meat-plate mounted upon said table between said bars and having the side edges thereof corresponding in contour to the inner faces of said bars, said plate reciprocating with said table and capable of being shifted on the table in the direction of the length thereof, means engaging with the plate for shifting it, and means for disconnecting said shifting means from the plate to permit of the lifting of the plate directly off the table when occasion requires.

3. A meat-slicing machine embodying a reciprocatory table, a removable meat-plate mounted upon the table and reciprocating therewith, means for shifting the plate upon the table in the direction of the length thereof, a supporting-frame provided with runways, a packing secured in said runways for forming a silencing means, wheels carried by the table and traveling upon said packing, and means for reciprocating said table upon said frame.

4. A meat-slicing machine embodying a reciprocatory table, a removable meat-plate mounted upon the table and reciprocating therewith, means for shifting the plate upon the table in the direction of the length thereof, a supporting-frame provided with runways, a packing secured in said runways for forming a silencing means, wheels carried by the table and traveling over said packing, said frame provided with an elongated slot, a depending member carried by the table and extending down through said slot for guiding the table when it is reciprocated, and means connected with said depending member for reciprocating the table upon the frame.

5. A meat-slicing machine embodying a reciprocatory table, a supporting-frame provided with runways, a packing secured in said runways for forming a silencing means, wheels carried by the table and traveling over said packing, said frame provided with an elongated slot, a depending member carried by the table and extending down through said slot for guiding the table when it is reciprocated, and means connected with said depending member for reciprocating the table upon the frame.

In testimony whereof I have hereunto set my hand in presence of two subscribing witnesses.

WILHELMUS ADRIANUS VAN BERKEL.

Witnesses:
  ADOLF ARIS KLEIN,
  WILLEM JACOBUS DE GRAAF.